United States Patent [19]

Russ

[11] Patent Number: 4,765,196
[45] Date of Patent: Aug. 23, 1988

[54] INTERMITTENT MOTION TRANSMITTING AND TIMING SYSTEM

[75] Inventor: David E. Russ, Rockford, Ill.

[73] Assignee: Sundstrand Corporation, Rockford, Ill.

[21] Appl. No.: 131,321

[22] Filed: Dec. 8, 1987

Related U.S. Application Data

[63] Continuation of Ser. No. 927,078, Nov. 5, 1986, abandoned.

[51] Int. Cl.⁴ .............................................. F16H 27/06
[52] U.S. Cl. ........................................ 74/436; 74/405
[58] Field of Search ................. 74/436, 24, 405, 437; 192/33 R, 93 A

[56] References Cited

U.S. PATENT DOCUMENTS

| | | | |
|---|---|---|---|
| 2,049,690 | 8/1936 | Cunningham | 74/436 |
| 2,124,213 | 7/1938 | Shackleton | 74/436 |
| 2,579,092 | 12/1951 | Rockwell | 74/24 |
| 2,594,466 | 4/1952 | Luther . | |
| 2,605,647 | 8/1952 | Duvoisin . | |
| 2,664,037 | 12/1953 | Debrie | 74/436 |
| 2,849,914 | 9/1958 | Vinten . | |
| 3,153,952 | 10/1964 | Thoma | 74/436 |
| 3,359,820 | 12/1967 | Wildhaber . | |
| 3,368,403 | 2/1968 | Granberg . | |
| 3,396,754 | 8/1968 | Scherillo . | |
| 3,404,585 | 8/1968 | Roper . | |
| 3,478,616 | 11/1969 | Smith | 74/436 |
| 3,572,143 | 3/1971 | Van Riemsdijk . | |
| 3,827,374 | 8/1974 | Winsor . | |
| 4,048,868 | 9/1977 | Lock . | |
| 4,470,318 | 9/1984 | Cremer et al. | 74/436 |
| 4,641,544 | 2/1987 | Russ | 74/405 |

FOREIGN PATENT DOCUMENTS 323062 10/1902 France ................. 74/436

Primary Examiner—Lawrence Staab
Attorney, Agent, or Firm—Wood, Dalton, Phillips, Mason & Rowe

[57] ABSTRACT

An intermittent motion transmitting and timing system for actuating an uplock latch device or the like to provide for high speed, timed power transmission at maximum load requirements. An inverse geneva drive mechanism is coupled between a rotational input drive and a rotatable output drive. A drive train between the input drive and the inverse geneva drive mechanism includes at least a pair of meshed elliptical gears for maximizing output torque for a given input torque. A drive train between the inverse geneva drive mechanism and the rotatable output includes a regular geneva drive mechanism and a shift mechanism. The inverse geneva drive mechanism, the regular geneva drive mechanism and the shift mechanism are coupled in timed relationship by an odometer device whereby the rotatable output is moved at its maximum load when the inverse geneva drive mechanism delivers maximum torque, and whereby the shift mechanism is actuated by the regular geneva drive mechanism when the inverse geneva drive mechanism is at a dwell condition.

12 Claims, 3 Drawing Sheets

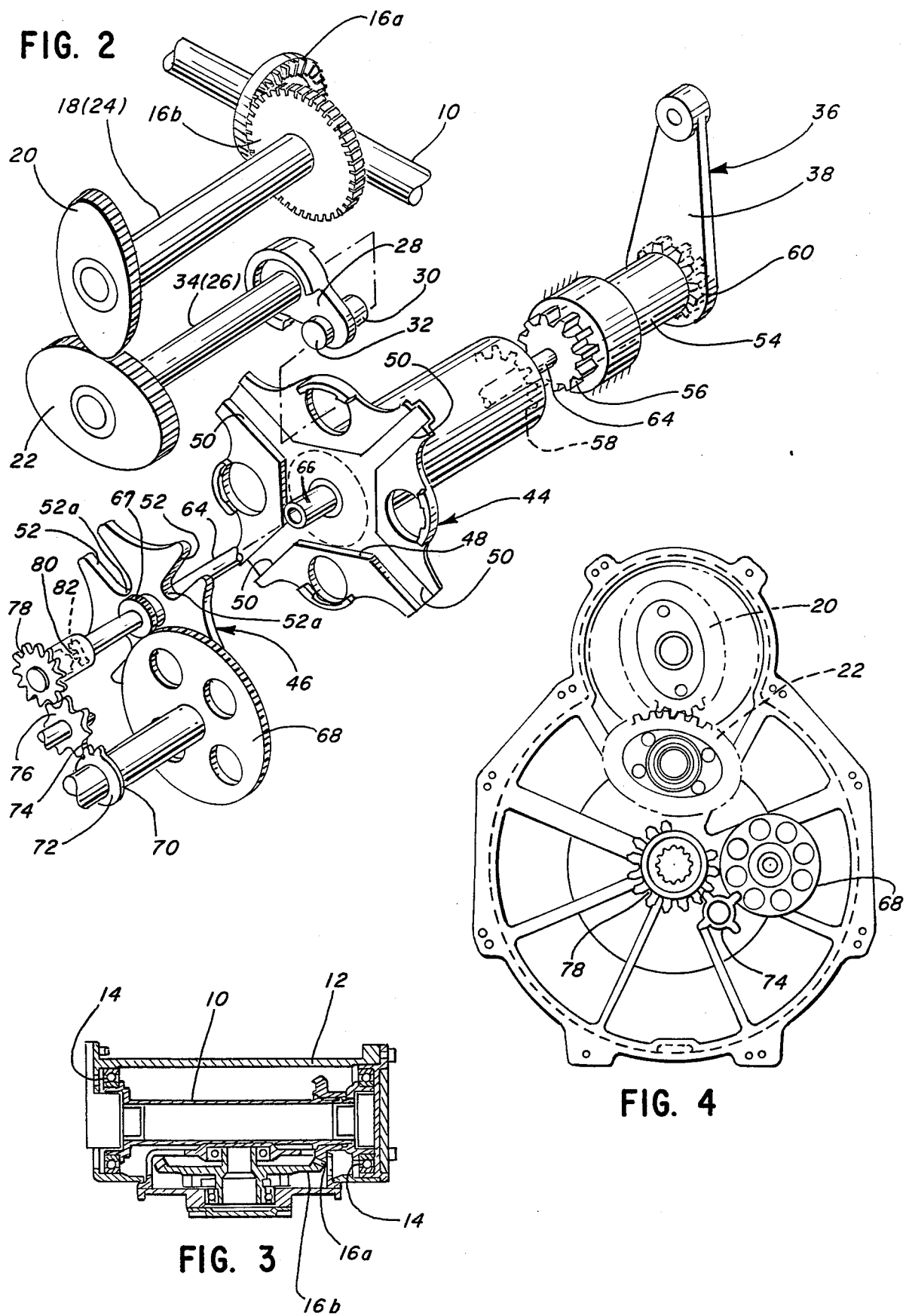

INTERMITTENT MOTION TRANSMITTING AND TIMING SYSTEM

This application is a continuation of application Ser. No. 927,078, filed Nov. 5, 1986, now abandoned.

FIELD OF THE INVENTION

This invention relates to an intermittent motion transmitting and timing system and particularly to such a system which is applicable for actuating an uplock latch device, or the like, to provide for high speed, timed power transmission at maximum load requirements. One type of motion transmitting and timing mechanism is shown in copending application Ser. No. 787,316, filed Oct. 15, 1985, and assigned to the assignee of this invention.

BACKGROUND OF THE INVENTION

Uplock drive systems are used to operate a latching device for securely closing large doors such as in aircraft. The uplock drive is required to provide a reliable mechanical timing function to close the latch when the door reaches a precise location. The latch must be released at the proper time and held stationary while the door opens and closes.

The time allowed for latch actuation is extremely short. Therefore, means must be provided for controlled acceleration and deceleration of the output means or linkage to minimize inertial effects. Furthermore, due to the instantaneous actuation involved, the output linkage of the uplock system must be engaged at a precise location without the shock of a sudden engagement which might damage the shift mechanism used within the system. The precise angular positioning requirements preclude the use of any device which might slip during engagement.

In addition, it would be desirable for the system to provide a variable gear ratio in order to minimize the peak input torque. Output motion is constrained to a short fraction of the door actuation cycle. Therefore, the output velocity must be fast over most of a given range. A higher gear ratio is preferred during high values of output torque, which occur at a given, definite location. The output motion preferably should be of maximum torque at a specific time, with the output grounded at all other times on both sides of this period.

This invention is directed to providing a new and improved intermittent motion transmitting and timing system which fulfills all of the above requirements and desired parameters.

SUMMARY OF THE INVENTION

An object, therefore, of the invention is to provide a motion transmission system which is intermittently operable to provide for high-speed, timed power transmission at maximum load requirements, such as for use in an uplock latch device, or the like.

In the exemplary embodiment of the invention, rotational input drive means and rotatable output means are provided. An inverse geneva drive mechanism includes a central open dwell area and communicating geneva drive slots. Drive train means are provided between the input drive means and the inverse geneva drive mechanism. The drive train means include a drive follower member movable between the central dwell area and into and out of the drive slots of the inverse geneva drive mechanism. At least a pair of meshed elliptical gears may be provided in the drive train means between the input drive means and the inverse geneva drive mechanism for minimizing the peak input torque and maximizing output torque for the given input torque.

Drive means are provided between the inverse geneva drive mechanism and the rotatable output means, including a regular geneva drive mechanism concentric with the inverse geneva drive mechanism and having geneva drive slots with radially inner closed ends and radially outer open ends. A drive follower member, commonly driven with the follower member of the inverse geneva drive mechanism, is provided for moving into and out of the drive slots of the regular geneva drive mechanism. The drive train means further include an odometer and shift mechanism operatively associated between the regular geneva drive mechanism and the rotatable output means.

The inverse geneva drive mechanism, the regular geneva drive mechanism and the shift mechanism are coupled in timed relationship whereby the rotatable output means is moved at its maximum load when the drive follower member of the inverse geneva mechanism is at the outer end of one of its drive slots for maximum torque. The shift mechanism is actuated by the regular geneva drive mechanism when the drive follower member of the inverse geneva drive mechanism is in the central dwell area thereof. In other words, the inverse geneva drive mechanism and the regular geneva drive mechanism alternate to actuate the output means at maximum torque and to shift the system at zero output torque, respectively.

The shift mechanism includes a shift spline concentric with the geneva mechanisms and movable axially into and out of driving association with the rotatable output means. Specifically, the inverse geneva drive mechanism includes an output spline means. The shift spline is in constant driving association with the rotatable output means and includes gear means movable into and out of mesh with the output spline means of the inverse geneva drive mechanism. Grounding gear means are provided for meshing with the gear means of the shift spline when the shift spline moves out of mesh with the output spline means of the inverse geneva drive mechanism. A pin and ramp device is incorporated in the shift mechanism to axially move the shift spline.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an exploded perspective view, somewhat schematically illustrated, of the major components of the system;

FIG. 3 is a horizontal section, on a reduced scale, taken along line 3—3 of FIG. 1;

FIG. 4 is a vertical section, on a reduced scale, taken generally along line 4—4 of FIG. 1;

DETAILED DESCRIPTION OF THE PREFERRED EMBODIMENT

Figure 1:
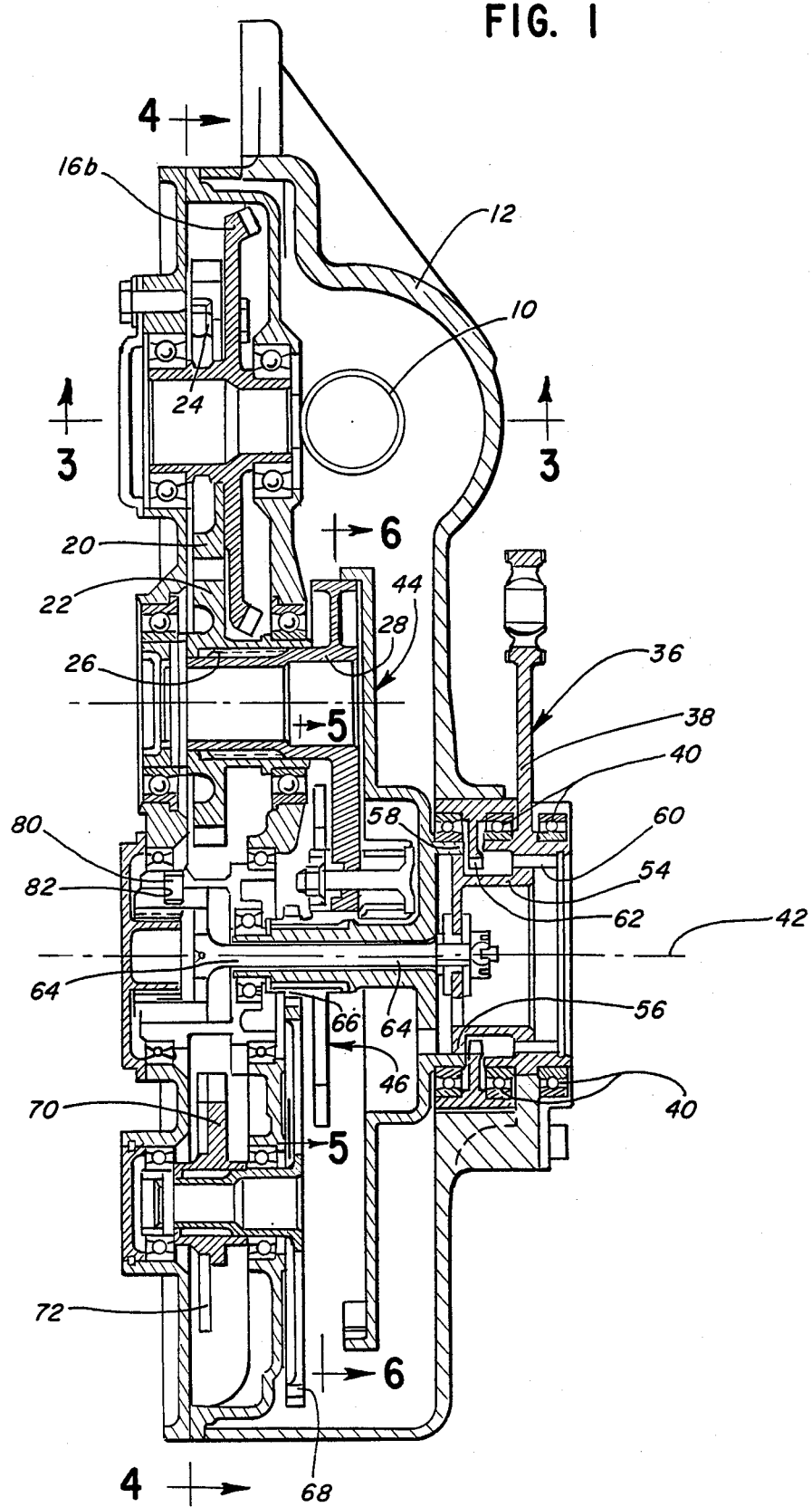
FIG. 1 is a section through the intermittent motion transmitting and timing system of the invention.

The invention is disclosed herein in a mechanical system as, for example, door actuating systems, where there is a need for some sort of a drive to provide a motion input to part of the system to cause some sort of predetermined movement which must be precisely followed by some different form of movement. For example, in a door actuation system as mentioned previously, a drive unit may be utilized first to move the door from an opened position to a closed position at which time a hook or a latch is operated to latch the door in the closed position. Subsequently, when the door is to be opened, the drive unit is operated first to release the latch and then to move the door from the closed position to the opened position With this understanding, and referring to the drawings in greater detail and first to FIGS. 1 and 2, the intermittent motion transmitting and timing system of this invention is connected to the same motor which moves the doors through a direct mechanical drive of which a drive shaft 10 is a component. The input motion is transferred through bevel gears 16a and 16b. Bevel gear 16b is drivingly connected by a shaft 18 (FIG. 2) to a first elliptical gear 20 which is in mesh with a second elliptical gear 22. It should be understood at this point that various components in FIG. 2 may be disproportionate in order to facilitate the exploded illustration. For instance, shaft 18 (FIG. 2) actually comprises bolts 24 as shown in FIG. 1 for interconnecting bevel gear 16b with elliptical gear 20.

Second elliptical gear 22 is splined, as at 26 (FIG. 1), to an input drive arm 28 which has geneva follower members 30 and 32 (see FIG. 2) on opposite sides thereof. The spline connection 26 illustrated in FIG. 1 is shown schematically by elongated shaft 34 in FIG. 2, again in order to facilitate the exploded depiction in FIG. 2.

The aforesaid rotational input drive means is effective to rotate a rotatable output means, generally designated 36, which includes an output arm 38 journaled in housing 12 by bearing means 40 (FIG. 1) for rotation about an axis 42 which defines the major intermittent motion and timing axis of the system.

Input arm 28 transmits the rotational input drive to an inverse geneva drive mechanism, generally designated 44, and a regular geneva drive mechanism, generally designated 46. Inverse geneva drive mechanism 44 includes a central dwell area 48 and geneva drive slots 50 radiating outwardly therefrom in communication with the central dwell area. Cam follower member 30 on geneva input arm 28 moves between central dwell area 48 and into and out of geneva drive slots 50.

Regular geneva drive mechanism 46 includes geneva drive slots 52 radiating outwardly from closed ends 52a to a dwell area which effectively is defined by the open area surrounding the regular geneva drive mechanism. Drive follower member 32 on the opposite side of input arm 28 rides into and out of drive slots 52 of regular geneva drive mechanism 46.

It can be seen that drive follower members 30 and 32 (FIG. 2) are driven in unison because of the fact that they are mounted on the opposite sides of common drive arm 28. Follower members 30 and 32 move within the dwell areas and spoke drive areas of inverse geneva drive mechanism 44 and regular geneva drive mechanism 46, respectively, in such a manner that they are alternatively effective. The inverse geneva drive mechanism is effective to rotate output arm 38 when drive follower member 30 is at its extreme outer location in one of the drive slots 50 of the inverse geneva drive mechanism to provide maximum torque output at that point which coincides with the maximum load requirements of the output arm for precise, timed actuation of the uplock device. When drive follower member 30 moves back into the central dwell area 48 of inverse geneva drive mechanism 44, regular geneva drive mechanism 46 is rotated by drive follower member 32 and is effective to shift the system and ground drive arm 38, as described hereinafter It can be seen from the above that inverse geneva drive mechanism 44 is geared to input shaft 10 to provide an intermittent motion whenever the input shaft is rotated. A shift spline 54 (see particularly FIG. 1) has two positions. The position shown in FIG. 1 has shift spline 54 in mesh, as at 56, with an output spline means 58 of inverse geneva mechanism 44 and in mesh, as at 60, with drive arm 38. When shift spline 54 is moved to the right as viewed in the drawings, output arm 38 will be grounded by means of shift spline 54 moving off of output spline means 58 of inverse geneva drive mechanism 44 and gear teeth 56 come into mesh with grounding gear means 62 on housing 12.

Figure 5:
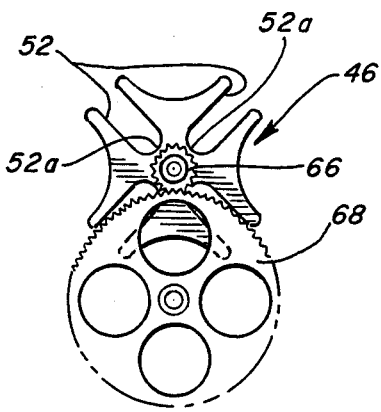
FIG. 5 is a vertical section, on a reduced scale, taken along line 5—5 of FIG. 1.
Figure 6:
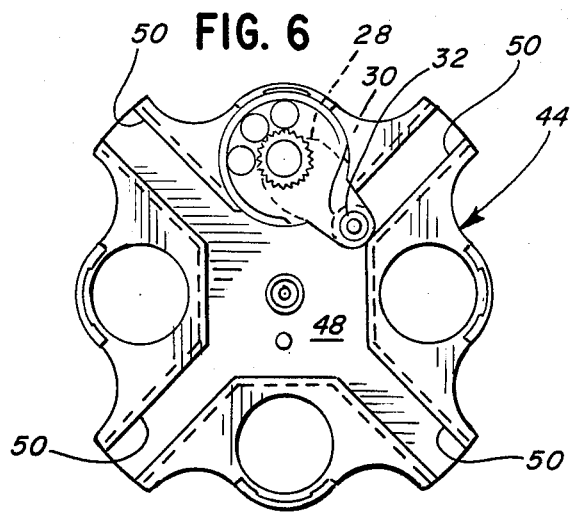
FIG. 6 is a vertical section, on a reduced scale, taken generally along line 6—6 of FIG. 1, isolating the components of inverse geneva drive mechanism.

The timing to move shift spline 54 axially as described above, i.e. along axis 42 (FIG. 1), is illustrated in FIGS. 2, 4 and 5 in conjunction with FIG. 1. More particularly, drive follower member 32 on geneva drive arm 28 becomes the input member of regular geneva drive mechanism 46 when drive follower member 30 is disposed within central dwell area 48 of inverse geneva drive mechanism 44. The regular geneva drive mechanism is fixed to an axial shift shaft 64 journalled within and axially movable relative to a cylindrical shaft 66 of the inverse geneva drive mechanism, and shaft 64 is fixed to shift spline 54. As seen below, regular geneva drive mechanism 46 will move only when inverse geneva drive mechanism 44 is completely stopped, i.e. drive follower member 30 disposed within dwell area 48.

A pinion 67 on regular geneva drive member 46 drives a gear 68 which is splined to an odometer gear 70. A locking plate 72 is connected to gear 70 and is designed to fit between any two of four teeth shown in an idler 74 (FIG. 4). The opposite side of idler 74 has a complete set of eight teeth 76 (see FIG. 2) to mesh with gears 70 and 78. Gear 78, in turn, is connected through a plurality of pins 80 (only one shown in FIG. 2) in operative association with an axially facing cam track 82 on shift shaft 64. The cam profile is shown in a projected or "rolled out" illustration in FIG. 7.

Figure 7:
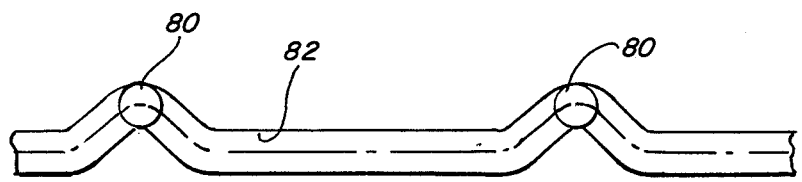
FIG. 7 is an enlarged "roll-out" depiction of the cam ramp and follower pins of the shift mechanism.

The odometer gear ratio is chosen to correspond with the configuration of regular geneva drive mechanism 46. When inverse geneva drive mechanism 44 is rotating output arm 38, pins 80 move in the straight-line portion of cam slot 82. On each incrementation of regular geneva drive mechanism 46, the odometer mechanism moves, either providing internal dwell or shifting pins 80 toward the ramps of the cam slot. During a dwell period of the inverse geneva drive mechanism, prior to output motion, pins 80 are located near the bottom of one of the ramps. At this time, gear 70 engages idler 74 and moves it to the position shown in FIG. 4. This causes pins 80 to move up the ramp of the cam slot, stopping at the peak of the ramp as shown in FIG. 7. Shift shaft 64 pulls shift spline 54 into mesh with output spline means 58 of inverse geneva drive mechanism 44 to provide a direct connection between the inverse drive mechanism and output arm 38.

As geneva drive follower 32 comes out of the respective slot 52 in regular geneva drive mechansim 46, drive follower member 30 engages into the next slot 50 in inverse drive mechanism 44 to drive output arm 38 through shift spline 54.

The next dwell action of the inverse geneva drive mechanism is used to drive the odometer mechanism through the remainder of its direct motion phase. This moves pins 80 down their respective ramps in cam slot 82 to disengage output arm 38 from the inverse geneva drive mechanism and connect the output arm to grounding gear 62. Subsequent, incremental motions of inverse geneva drive mechanism 44 do not cause reengagement with output arm 38 provided input shaft 10 is reversed within a designated number of input shaft revolutions. Reversal of the input shaft will move output arm 38, in this embodiment, ninety-degrees at the correct time followed by a dwell.

Figure 8:
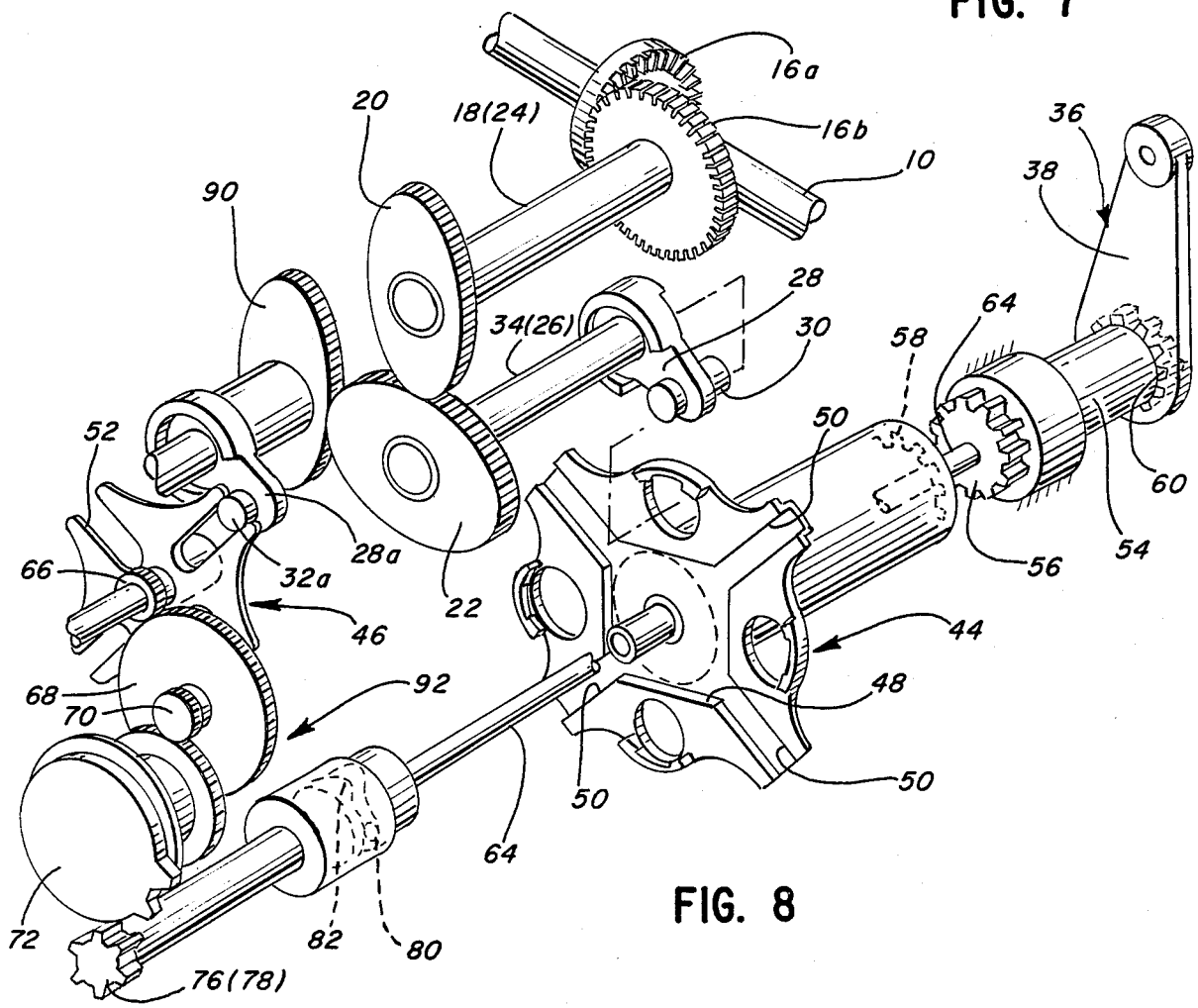
FIG. 8 is an exploded perspective view, similar to that of FIG. 2, of a modified form of the invention.

Lastly, FIG. 8 shows an alternate form of the invention wherein a third elliptical gear 90 has been added to the drive train means between input shaft 10 and the inverse and regular geneva drive mechanisms 44 and 46, respectively. Otherwise, the function and operation of the system is identical. This alternative is to accommodate a higher torque requirement which might require an unduly large geneva drive arm 28 (FIG. 2). With the arrangement of FIG. 8, an additional geneva drive arm 28a is added, driven by third elliptical gear 90, with a drive follower member 32a for driving regular geneva drive mechanism 46. This also results in a slight modification to the arrangement of the odometer components, generally designated 92, but like numerals have been applied in FIG. 8 to designate functionally similar components.

From the foregoing, it can be seen that a new and improved intermittent motion transmitting and timing system has been provided wherein the point of maximum load is reached when maximum torque is delivered by the system. The elliptical gears provide desirable output motion characteristics whereby the point of maximum output torque can be made coincident with a large gear ratio to minimize the input torque. The inverse geneva drive mechanism provides smooth and controlled accelerations and decelerations to minimize inertial effects. The combination of a standard or regular geneva drive mechanism with an inverse geneva drive mechanism provides a dwell to shift from engagement to disengagement between stationary splines to minimize engagement problems. Dwells are provided at both ends of the intermittent motion from the design of the odometer and regular geneva combination It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An intermittent motion transmitting and timing system for actuating an uplock latch device or the like to provide for high speed, timed power transmission at maximum load requirements, comprising:

rotational input drive means;

rotatable output means;

an inverse geneva drive mechanism including a central open dwell area and communicating geneva drive slots;

first drive train means between the input drive means and the inverse geneva drive mechanism, including a drive follower member movable between the central dwell area and into and out of the drive slots of the inverse geneva drive mechanism;

second drive train means between the inverse geneva drive mechanism and the rotatable output means, including a regular geneva drive mechanism concentric with the inverse geneva drive mechanism and having geneva drive slots with radially inner closed ends and radially outer open ends, a drive follower member driven in unison with the drive follower member of the inverse geneva drive mechanism for moving into and out of the drive slots of the regular geneva drive mechanism, and a shift mechanism operatively associated between the regular geneva drive mechanism and the rotatable output means; and the inverse geneva drive mechanism, the regular geneva drive mechanism and the shift mechanism being coupled in timed relationship whereby the rotatable output means is moved at its maximum load when the drive follower member of the inverse geneva drive mechanism is at the outer end of one of its drive slots for maximum torque, and whereby the shift mechanism is actuated by the regular geneva drive mechanism when the drive follower member of the inverse geneva drive mechanism is in the central dwell area thereof.

2. The intermittent motion transmitting system of claim 1 wherein said input drive means include at least a pair of meshed elliptical gears for maximizing output torque for a given input torque.

3. The intermittent motion transmitting system of claim 1 wherein said shift mechanism includes a pin and ramp device.

4. The intermittent motion transmitting system of claim 1 wherein said shift mechanism includes a shift spline concentric with the geneva mechanisms and movable axially into and out of driving association with the rotatable output means 5. The intermittent motion transmitting system of claim 4 wherein the inverse geneva drive mechanism includes an output spline means, and said shift spline is in constant driving engagement with the rotatable output means and includes gear means movable into and out of mesh with the output spline means of the inverse geneva drive mechanism.

6. The intermittent motion transmitting system of claim 5, including grounding spline means for meshing with the gear means of the shift spline when the shift spline moves out of mesh with the output spline means of the inverse geneva drive mechanism.

7. An intermittent motion transmitting and timing system for actuating an uplock latch device or the like to provide for high speed, timed power transmission at maximum load requirements, comprising:

rotational input drive means;

rotatable output means;

an inverse geneva drive mechanism;

first drive train means between the input drive means and the inverse geneva drive mechanism;

second drive train means between the inverse geneva drive mechanism and the rotatable output means, including a regular geneva drive mechanism and a shift mechanism operatively associated between the regular geneva drive mechanism and the rotatable output means; and the inverse geneva drive mechanism, the regular geneva drive mechanism and the shift mechanism being coupled in timed relationship whereby the rotatable output means is moved at its maximum load at the maximum output torque of the inverse geneva drive mechanism, and whereby the shift mechanism is actuated by the regular drive mechanism when the inverse geneva drive mechanism is in a no torque condition.

8. The intermittent motion transmitting system of claim 7 wherein said input drive means include at least a pair of meshed elliptical gears for maximizing output torque for a given input torque.

9. The intermittent motion transmitting system of claim 8 wherein said shift mechanism includes a pin and ramp device.

10. The intermittent motion transmitting system of claim 8 wherein said shift mechanism includes a shift spline concentric with the geneva mechanisms and movable axially into and out of driving association with the rotatable output means.

11. The intermittent motion transmitting system of claim 10 wherein the inverse geneva drive mechanism includes an output spline means, and said shift spline is in constant driving engagement with the rotatable output means and includes gear means movable into and out of mesh with the output spline means of the inverse geneva drive mechanism.

12. The intermittent motion transmitting system of claim 11, including grounding spline means for meshing with the gear means of the shift spline when the shift spline moves out of mesh with the output spline means of the inverse geneva drive mechanism.

* * * * *